US010518792B2

(12) United States Patent  
Denny et al.

(10) Patent No.: US 10,518,792 B2  
(45) Date of Patent: Dec. 31, 2019

(54) ROADWAY WORKER SAFETY SYSTEM AND METHODS OF WARNING

(71) Applicant: MILLER FELPAX CORPORATION, Winona, MN (US)

(72) Inventors: Joseph M. Denny, Fairport, NY (US); Muhammad Mohsin Naseer, Punjab (PK)

(73) Assignee: MILLER FELPAX CORPORATION, Winona, MN (US)

( * ) Notice: Subject to any disclaimer, the term of this patent is extended or adjusted under 35 U.S.C. 154(b) by 129 days.

(21) Appl. No.: 15/659,342

(22) Filed: Jul. 25, 2017

(65) Prior Publication Data

US 2017/0320507 A1     Nov. 9, 2017

Related U.S. Application Data

(63) Continuation-in-part of application No. 14/864,185, filed on Sep. 24, 2015, now Pat. No. 10,106,079.

(Continued)

(51) Int. Cl.
  *B61L 23/06*   (2006.01)
  *B61L 29/24*   (2006.01)
  (Continued)

(52) U.S. Cl.
  CPC .............. *B61L 23/06* (2013.01); *B61L 23/00* (2013.01); *B61L 27/0005* (2013.01);
  (Continued)

(58) Field of Classification Search
  None
  See application file for complete search history.

(56) References Cited

U.S. PATENT DOCUMENTS 3,167,282 A  *  1/1965  Reigh ...................... B61L 1/06  
                                                          200/85 R  
4,128,218 A  *  12/1978  Pohlig ..................... B61L 1/161  
                                                          246/247

(Continued)

OTHER PUBLICATIONS

How Wireless Mesh Networks Work; Published Aug. 22, 2014; Pertinent Pages, Whole Document (Year: 2014).*

(Continued)

*Primary Examiner* — Steven Lim  
*Assistant Examiner* — Muhammad Adnan  
(74) *Attorney, Agent, or Firm* — Stinson LLP (57) ABSTRACT

Systems and methods are disclosed for reliable detection of oncoming trains and for warning roadway personnel working on the railroad track of the oncoming train. A train detection system includes a wireless communication network further including train detection modules attached to catenary poles along the sides of the railroad track. Each train detection module is equipped with at least two diverse sensors configured to detect trains and other on-track vehicles. Each train detection sensor is simultaneously active and works with other train detection sensors to detect an approaching train and generate train alerts. The train alerts are transmitted wirelessly over the wireless communication network by the train detection modules. The system transmits train alerts to personal alert devices worn by roadway workers. The personal alert device forms an ad-hoc wireless network with the train detection modules.

34 Claims, 10 Drawing Sheets

Related U.S. Application Data (60) Provisional application No. 62/366,307, filed on Jul. 25, 2016.

(51) Int. Cl.

| | | |
|---|---|---|
| *H04W 24/04* | (2009.01) | |
| *B61L 23/00* | (2006.01) | |
| *B61L 27/00* | (2006.01) | |
| *B61L 29/28* | (2006.01) | |
| *B61L 29/30* | (2006.01) | |
| *E01F 9/30* | (2016.01) | |
| *E01F 9/654* | (2016.01) | |
| *H04W 4/70* | (2018.01) | |
| *B60Q 7/00* | (2006.01) | |

(52) U.S. Cl.
CPC ............. *B61L 29/24* (2013.01); *B61L 29/28* (2013.01); *B61L 29/30* (2013.01); *E01F 9/30* (2016.02); *E01F 9/654* (2016.02); *H04W 4/70* (2018.02); *H04W 24/04* (2013.01); *B60Q 7/00* (2013.01)

(56) References Cited

U.S. PATENT DOCUMENTS

| | | | | |
|---|---|---|---|---|
| 4,207,569 A | * | 6/1980 | Meyer | B61L 23/06 246/121 |
| 5,038,704 A | * | 8/1991 | Dean | B61L 23/06 116/173 |
| 5,129,605 A | * | 7/1992 | Burns | B61L 25/021 246/122 R |
| 5,148,150 A | * | 9/1992 | White | A45C 13/24 200/61.52 |
| 5,620,155 A | * | 4/1997 | Michalek | B61L 29/24 246/121 |
| 5,727,758 A | * | 3/1998 | Penza | B61L 15/0027 246/124 |
| 5,735,492 A | * | 4/1998 | Pace | B61L 9/04 246/125 |
| 5,864,304 A | * | 1/1999 | Gerszberg | B61L 29/18 246/122 R |
| 5,867,801 A | * | 2/1999 | Denny | B61L 3/125 246/169 R |
| 5,924,651 A | * | 7/1999 | Penza | B61L 23/06 246/124 |
| 5,954,299 A | * | 9/1999 | Pace | B61L 9/04 246/125 |
| 6,020,815 A | * | 2/2000 | Eslambolchi | B61L 1/06 246/292 |
| 6,113,037 A | * | 9/2000 | Pace | B61L 23/06 246/124 |
| 6,145,792 A | * | 11/2000 | Penza | B61L 3/125 246/122 R |
| 6,232,887 B1 | * | 5/2001 | Carson | B61L 23/06 340/4.21 |
| 6,323,785 B1 | * | 11/2001 | Nickell | B61L 23/06 246/292 |
| 6,371,416 B1 | * | 4/2002 | Hawthorne | B61L 23/06 246/122 R |
| 7,624,952 B1 | * | 12/2009 | Bartek | B61L 23/06 246/124 |
| 8,061,662 B1 | * | 11/2011 | Bartek | B61L 23/06 246/203 D |
| 8,109,474 B2 | * | 2/2012 | Bartek | B61L 1/02 246/124 |
| 8,157,219 B2 | * | 4/2012 | Ashraf | B61L 29/22 246/130 |
| 8,344,877 B2 | | 1/2013 | Sheardown et al. | |
| 8,773,275 B1 | * | 7/2014 | Parenteau | G01S 19/16 340/539.13 |
| 8,786,428 B2 | | 7/2014 | Sheardown et al. | |
| 8,952,805 B2 | * | 2/2015 | Baines | G08B 21/02 340/539.12 |
| 9,542,852 B2 | | 1/2017 | Cross et al. | |
| 9,767,968 B2 | * | 9/2017 | Braband | B61L 23/06 |
| 9,902,411 B2 | * | 2/2018 | Bartek | B61L 25/026 |
| 10,179,595 B2 | * | 1/2019 | Carlson | G01S 19/17 |
| 2004/0073342 A1 | * | 4/2004 | Kane | B61L 3/004 701/19 |
| 2005/0174974 A1 | * | 8/2005 | Sonntag | H04W 92/20 370/338 |
| 2005/0275513 A1 | * | 12/2005 | Grisham | B60Q 9/008 340/435 |
| 2006/0015224 A1 | * | 1/2006 | Hilleary | B61L 3/125 701/19 |
| 2006/0116837 A1 | * | 6/2006 | Hager | G01C 25/00 702/95 |
| 2007/0085734 A1 | * | 4/2007 | Whitehead | G01S 19/07 342/357.24 |
| 2007/0274158 A1 | * | 11/2007 | Agam | B61L 23/041 367/96 |
| 2010/0102954 A1 | * | 4/2010 | Radivojevic | G01S 11/06 340/539.11 |
| 2010/0130873 A1 | * | 5/2010 | Yuen | A61B 5/0205 600/484 |
| 2010/0163687 A1 | * | 7/2010 | Brand | B61L 3/127 246/117 |
| 2011/0006912 A1 | * | 1/2011 | Sheardown | B61L 23/06 340/901 |
| 2011/0009814 A1 | * | 1/2011 | Tsoukalis | A61M 5/14224 604/66 |
| 2011/0030875 A1 | * | 2/2011 | Conte | G01V 15/00 156/64 |
| 2011/0278401 A1 | * | 11/2011 | Sheardown | B61L 23/06 246/167 A |
| 2012/0218099 A1 | * | 8/2012 | Egawa | G08B 25/009 340/502 |
| 2014/0104081 A1 | * | 4/2014 | Cross | G08G 9/00 340/989 |
| 2014/0111356 A1 | * | 4/2014 | LeFebvre | B61L 15/0081 340/988 |
| 2014/0166820 A1 | * | 6/2014 | Hilleary | B61L 29/246 246/125 |
| 2014/0210646 A1 | * | 7/2014 | Subramanya | B61L 29/28 340/928 |
| 2015/0091716 A1 | * | 4/2015 | Hathaway | B60Q 1/525 340/435 |
| 2015/0336011 A1 | * | 11/2015 | Hong, I | F41J 3/02 386/227 |
| 2016/0144875 A1 | * | 5/2016 | Kim | B61L 25/026 370/328 |
| 2016/0353385 A1 | * | 12/2016 | Skocypec | H04W 52/0261 |
| 2017/0148323 A1 | * | 5/2017 | Shubs, Jr. | G08G 1/13 |

OTHER PUBLICATIONS

MeshMon: A Multi-tiered Framework for Wireless Mesh Network Monitoring; Published: Jul. 6, 2010 (Year: 2010).*

* cited by examiner

ROADWAY WORKER SAFETY SYSTEM AND METHODS OF WARNING

RELATED APPLICATIONS

This non-provisional application claims priority to U.S. Provisional Patent Application Ser. No. 62/366,307, filed on Jul. 25, 2016, and to currently pending U.S. patent application Ser. No. 14/864,185, filed on Sep. 24, 2015, both of which are hereby incorporated by reference in their entirety.

BACKGROUND

The safe operation of transit and freight rail services requires periodic inspection and maintenance of railroad tracks on a regular basis. The roadway workers may be at risk from approaching trains and other maintenance vehicles as they work on railroad tracks. Roadway workers can be at risk of accidents if they are not sufficiently warned of approaching trains while working on and around railroad tracks. Because of the noise and commotion of construction and repair activities, workers working in the proximity of railroad tracks need to be alerted of approaching trains that they might not otherwise see or hear.

The present invention relates generally to protecting roadway workers by detecting an approaching train and providing early alerts to the workers. The system consists of wirelessly connected train detection modules and personal alert devices and is capable of detecting an approaching train or a maintenance vehicle and communicating train alerts to personal alert devices over an ad hoc wireless network. The system further includes on-board devices capable of receiving real time worker location information transmitted by the train detection modules and providing alerts to the train operator when a work zone is approaching.

In another aspect, the present disclosure relates to a roadway worker warning system and warning methods, and more particularly, to a train detection and warning system for train operators working in proximity to railroad tracks.

DESCRIPTION OF RELATED ART

Roadway workers working on railroad tracks need to be warned of approaching trains as they are involved in track maintenance activities in a high noise atmosphere and might not be able to sense oncoming trains due to the high noise environment.

In the past, numerous methods and systems have attempted to provide warnings of the approaching trains to the roadway workers. One such traditional method uses flaggers located at a pre-defined distance from the work area. Flaggers are instructed to warn roadway workers of approaching trains using flags and whistles but this method is not always suitable as work activities can produce loud noises making the worker unable to identify and acknowledge the warnings issued by the flaggers. Therefore, this method is not reliable enough to ensure roadway worker safety in all working conditions.

In an effort to enhance the safety of roadway workers, various systems have been developed in the past that detect an approaching train and warn roadway workers. One such system is disclosed in U.S. Pat. No. 7,624,952 which makes use of a radio transceiver placed on-board a train. The roadway workers also carry warning devices equipped with a similar radio transceiver. The on-board radio transceiver continuously transmits radio frequency signals that are picked up by the worker wearable devices and an alarm is generated on receiving the warning signal. Similarly, the worker wearable devices also transmit radio signals that are received by the on-board radio module to warn the train operator about the presence of workers nearby. This system has an inherent problem due to the fact that any sort of communication failure between the worker warning device and the on-board device could make the workers unaware of the oncoming train. Another disadvantage is that train detection and communication with worker wearable devices is not possible without installing the on-board device on every train. Another solution proposed in the same system makes use of vehicle on board controls unit (VOBC) available on trains. The VOBC can control brakes, cab displays and other devices available on board such as RFID tag readers. The proposed system includes a portable tag powered by an internal battery that interacts with the on-board tag reader to send a warning to the train operator. One drawback of this approach is that the portable tags can be misplaced and any misplaced tags can result in false warnings.

Another system proposed in U.S. Pat. Nos. 8,109,474 and 7,624,952 uses a portable train detector to detect an approaching train. A dual ultrasonic sensor is used as a train detector and is placed adjacent to the rail in order to detect the train wheel movement. The main disadvantage of this system is the limited sensing range of the ultrasonic sensors, which is around 20 inches, which requires the detection unit to be directly installed on one of the rails using special clamping means. The installation process is complex and requires significant amount of time and effort during which the track is not available for normal train operation.

One other system, proposed in U.S. Pat. No. 8,344,877 B2, makes use of RFID tags for communication between detectors and worker devices. The detectors contain transceivers capable of receiving data from worker devices. This data is then relayed to a central information processing center (CIPC). Similarly, information from the equipped train is also relayed to the CIPC either directly or through the wayside detectors. The CIPC, based on the train and worker information such as location of workers and speed of train, makes a decision to inform the worker of the approaching train. This solution relies on a central information processing center (CIPC) for making decisions and may not be reliable in situations when the information from the detectors or the equipped train cannot be relayed to the CIPC due to communication link failures. The CIPC may thus become a single point of failure in the proposed system under certain work conditions.

Another suggested solution is proposed in U.S. Pat. No. 8,786,428 B2. The solution uses station BLARE units (S-BUs), train BLARE units (T-BUs) and off-track BLARE units (O-BUs) employed along the track to detect and warn workers of an approaching train and train operators of a protected work zone. The S-BUs, T-BUs and O-BUs all contain an RFID tag reader to detect a portable tag carried by workers. The S-BUs are deployed on the start of the track to be protected and allow the worker to enter information such as the size of workgroup. All workers register themselves through RFID tags which are read by the readers on S-BUs in turn allowing to form a protected work zone. All other units are T-BUs where workers register through RFID tags as they move along the track forming a protected work zone wherever the workers move. The workers can also move off the track by registering through O-BUs. Lights and audible alarms are available on all the units to provide warning indications to workers and train operators. All the units have local data processing units (LDPUs) which are used to control the functions of various peripherals available on the units. All LDPUs are connected to a transit control via central data processing (CDP) and network controller. The LDPUs cannot perform any logical calculations and all the units are controlled by the central data processing unit which is also responsible for making decisions. This approach of using a central data processing unit may not be reliable due to the reasons mentioned earlier and can become a single point of failure under some working situations.

One other solution, proposed in U.S. Pat. No. 9,542,852 B2, employs RF transceivers to detect trains approaching a work zone and to warn roadway workers of the oncoming train. The system comprises personal notification units (PNUs) containing RF transceivers that provide train warning notifications to the workers whereas vehicle computer units (VCUs) containing RF transceivers deliver warnings of an approaching work zone to the train operators. The PNUs transmit location based data to VCUs which in turn send the vehicle location information to the PNUs. Based on the location information, warnings are generated for workers in the form of audible, visual and vibration alerts whereas VCU may use positive train control (PTC) to control train brake and speed depending on the changing conditions. The VCU may provide worker locations to the operator through a screen. In addition, repeater units known as priority detectors also forward train detection warnings to PNUs, VCUs and other system devices. A central control server is also a part of the proposed system, which can also receive data from the PNUs and VCUs via priority detectors and process that information to send warning signals to PNUs and VCUs. The main drawback of this system is that the system is dependent on direct RF communications between PNUs and VCUs and any communication failure between the two could result in partial or total system failure. Furthermore, it requires installing the onboard vehicle computer unit and related modules in all the trains.

SUMMARY OF THE INVENTION

In view of the disadvantages inherent in the prior art systems, the present invention provides a reliable and efficient system for timely detecting an approaching train and providing voice, visual and haptic alerts to the roadway workers on portable personal alert devices.

It is a further objective of the present invention that the train detection be carried out by train detection modules placed along the track at appropriate locations.

It is a further objective of the present invention that the train detection be carried out using multiple diverse sensors that work simultaneously in order to detect an approaching train or a maintenance vehicle reliably in real time.

It is a further objective of the present invention that the train detection modules be capable of detecting trains on multiple adjacent tracks.

It is a further objective of the present invention that the train detection modules form a wireless network.

It is a further objective of the present invention to provide train alerts to the roadway workers using portable personal alert devices.

It is a further objective of the present invention that the personal alert devices interact with the train detection modules to form a dynamic work zone as the roadway workers move along the track.

It is a further objective of the present invention that the train detection modules and the personal alert device communicate over an ad hoc wireless network.

It is still a further objective of the present invention that the train detection modules and the personal alert devices communicate with each other in brief and dedicated time intervals in order to enhance the battery life and optimize radio spectrum usage.

It is a further objective of the present invention to use spread spectrum radio communications in order to minimize the effect of radio interference.

It is a further objective of the present invention that the train detection modules transmit special beacons for operator alert devices placed onboard the train and the beacons be transmitted only upon detecting a train.

It is a further objective of the present invention that the beacons transmitted by the train detection modules contain real time location information of the work zone.

It is a further objective of the present invention that the personal alert devices provide voice alerts to roadway workers using bone conduction headphones in order to enhance situational awareness of the roadway workers.

DETAILED DESCRIPTION

The embodiments described herein relate to protecting roadway workers by detecting an approaching train and providing alerts to the roadway workers. The system is based on a communication network of train detection modules and personal alert devices wherein the train detection modules are configured to detect approaching vehicles, such as a train or a maintenance vehicle, and communicating an alert signal wirelessly to the personal alert devices. The system further includes an on-board operator alert device configured to receive information regarding location of roadway workers transmitted by train detection modules and providing alerts to the train operator when a work zone is approaching.

Moreover, the embodiments described herein provide a reliable and efficient system configured to detect an approaching train and provide a combination of audio, visual and haptic alerts to the roadway workers about the location of the train with respect to the work zone (or work site). The embodiments utilize multiple diverse detection sensors described herein, which can be simultaneously active, in order to detect an approaching train or a maintenance vehicle reliably and in real time. The train detection sensors include, without limitation, laser rangefinders, image sensors, light sensors, frequency modulated continuous wave RADAR ("FMCW RADAR"), infrared sensors, and inertial measurement units ("IMUs"). The train detection modules communicate with each other to form a peer-to-peer mesh network using low power radio modules operating in the industrial, scientific, and medical radio band (ISM band). Moreover, the personal alert devices establish an ad hoc wireless network with the train detection modules using the radio modules. ISM band radio communications and other suitable communications methods are used to establish a wireless mesh network between at least the train detector modules and the personal alert devices. Additionally, the embodiments provide means to communicate voice alerts to the roadway workers using bone conduction headphones thus making sure that the roadway worker's situational awareness is not compromised.

In some examples, the embodiments described herein are configured to use spread spectrum radio communications in radio bands including the ISM band to facilitate minimizing the effect of radio interference of transmitted beacons containing location information about the work site over ISM band radios. Furthermore, the systems and methods disclosed provide information regarding location or locations of the work zone to a train operator device, in real time. Additionally, the embodiments provide voice alerts to the personal alert devices and to the railroad worker using bone conduction technology so that the situational awareness of a railroad worker is not compromised. The systems and methods described herein include a variety of configurations. Therefore, the description and figures are to be understood as exemplary. The exemplary system may be used in any work zone for monitoring or warning individuals of the approach of moving vehicles or moving objects.

Figure 1:
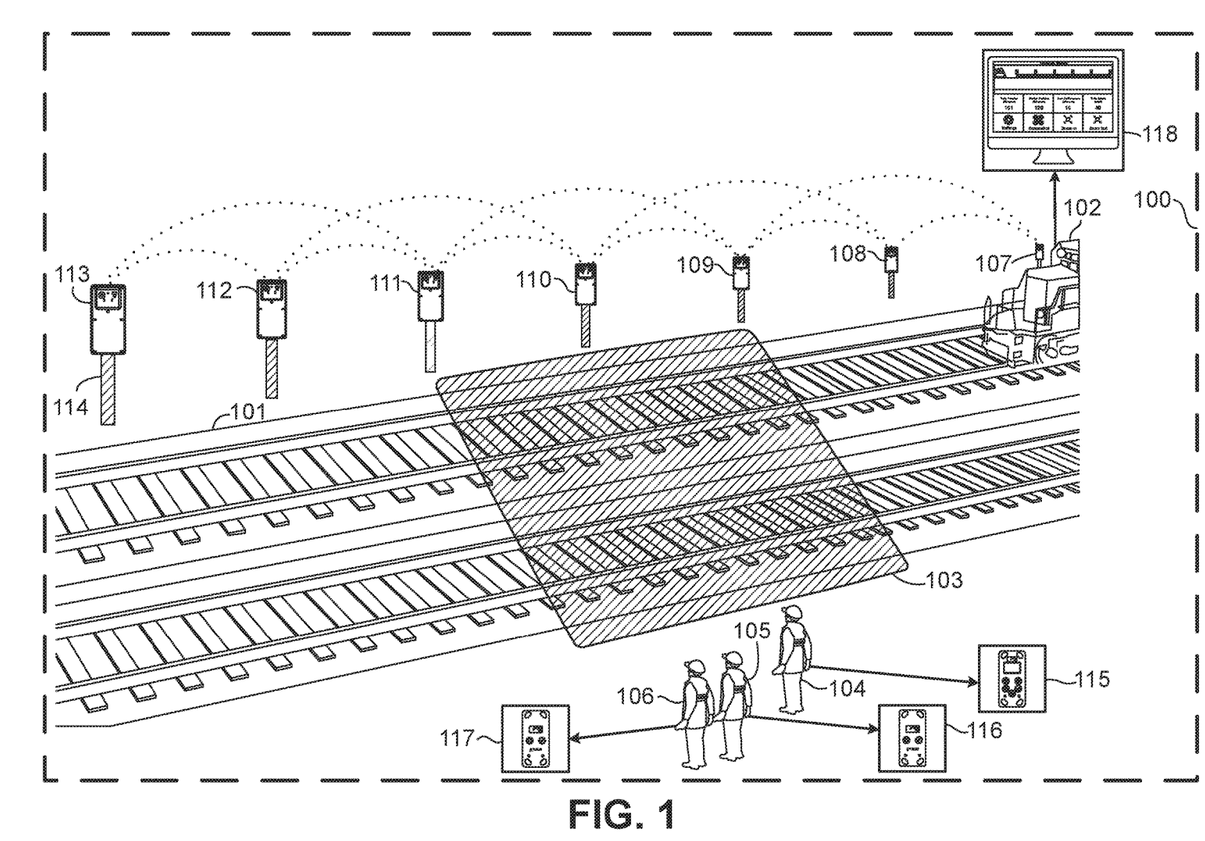
FIG. 1 is a system diagram providing an overview of a railroad track operatively coupled to an exemplary railroad worker safety system wherein the system includes a network of train detection modules, personal alert devices, and an operator alert device.

FIG. 1 is a system diagram showing a railroad track 101 equipped with a worker safety system according to one preferred embodiment of the present invention. The system includes a wireless mesh network of train detection modules, operator alert device and personal alert devices. The train detection module 113 is shown mounted on a structure such as, but not limited to, a milepost 114. The train detection modules can be attached permanently or temporarily to the structure 114. The train detection modules include a plurality of diverse sensors configured to detect trains in real time. The train detection modules communicate with each other using spread spectrum radio transceivers to form a peer-to-peer wireless mesh network such that each train detection module is connected to at least two adjacent train detection modules on either side. In the exemplary embodiment, the wireless communications take place in the 900 MHz ISM band. Alternatively, other communication bands or platforms may be used.

A train 102 is shown moving towards a work zone 103 with roadway workers 104, 105 and 106 working alongside the railroad track 101. The system is capable of warning the roadway workers 104, 105 and 106 of the train 102 approaching the work zone 103. The system is also capable of warning the train operator of the workers 104, 105 and 106 working in the work zone 103 ahead. The train 102 advancing towards the work zone 103 is detected by the train detection module 107. In the exemplary embodiment, train detection module 107 is most proximate to train 102 and therefore capable of detecting train 102. However, in some embodiments, train detection modules 108, 109, 110, 111, 112, and 113 may detect train 102. The train detection module 107 generates and propagates an alert signal along the primary wireless network of train detection modules 108, 109, 110 111, 112, and 113. The train detection modules 109, 110 and 111 communicate the alert signal to the personal alert devices 115, 116 and 117 associated with roadway workers 104, 105, and 106 respectively. The personal alert devices 115, 116 and 117 provide audible, visual and haptic alerts to the roadway workers 104, 105 and 106. Other warning means may also be used such as any already installed blue flag devices as the proposed system 100 is also capable of being integrated with such devices. The personal alert devices 115, 116 and 117 are also capable of communicating with any commercially available bone conduction headphones over Bluetooth or any other suitable wireless protocol such that the roadway worker is warned of an approaching train using audio alerts including voice alert messages.

The position of personal alert devices 115, 116, and 117 relative to the train detection modules is used by the system to define boundaries of the work zone 103. Specifically, when personal alert devices 115, 116, and 117 are within a minimum distance of a particular train detection module, such modules are part of the work zone 103. Thus, in the example of FIG. 1, if worker 106 moved towards train detection module 112, the work zone 103 would expand and be defined by train detection modules 112, 111, 110, and 109. The information regarding boundaries of the work zone is communicated to the entire communication network of train detection modules in real time.

The operator alert device 118 is configured to alert the operator if the train 102 is approaching towards the work zone 103. Each train detection module 108, 109, 110, 111, 112, and 113 in the backbone network is configured to transmit a brief RF beacon containing location information regarding the location of the work zone 103 whenever it detects a train. The location information includes at least one milepost number defining at least one boundary of the work zone. The location information also includes the unique identifier of the train detection module transmitting the beacon. The operator alert device 118 receives the beacons and displays relevant information to the train operator using an LCD screen or other similar visual means.

Figure 2:
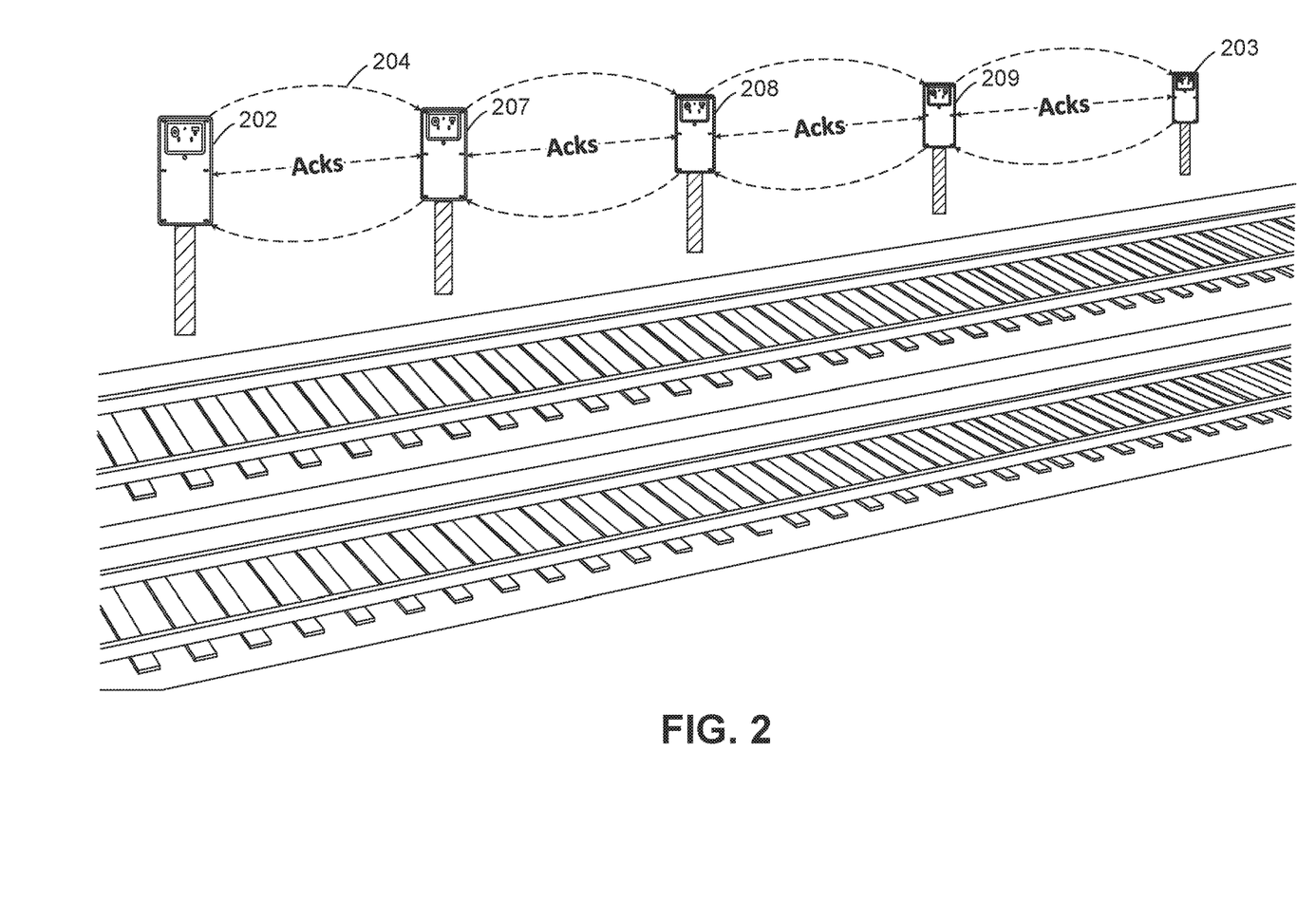
FIG. 2 is a diagram of the primary Train Detection Module (TDM) wireless mesh network of FIG. 1 comprising train detection modules on an equipped track.

FIG. 2 shows the primary Train Detection Module (TDM) wireless network of five train detection modules wirelessly connected in a peer-to-peer mesh topology. FIG. 2 is exemplary and in other embodiments, the TDM wireless network can include more or fewer train detection modules. The TDM wireless network depicted in FIG. 2 allows any number of train detection modules to be connected. In the example embodiment, train detection modules are connected with each other such that each train detection module is connected to at least two other train detection modules on each side. In other words, each train detection module is in communication with at least its nearest available neighbors and at least its next-nearest available neighbors. For example, TDM 208 is in communication with TDM 202, 203, 207, and 209.

Certain TDM nodes have special roles in the TDM network. For example, in FIG. 2, TDM 202 (situated at the far left end of the network) is given a special role to initiate periodic status update messages and collect and store network status information for the entire network. In the example embodiment of FIG. 2 TDM 202 transmits a network heartbeat message 204 to its nearest neighbor, TDM 207, which sends back an acknowledgement message. TDM 207 (or any other nearest neighbor) also forwards the heartbeat message 204 to the next neighbor along the path, TDM 208. Prior to forwarding heartbeat message 204, TDM 207 appends its status information to the message 204. Such status information may include the train detection status. Status information may also include the number of personal alert devices connected to the network. As such, the heartbeat message 204 may include current data usable to describe the work zone 103 and the location of train 102, shown in FIG. 1.

The TDM network may be described as self-healing because if TDM 202 does not receive an acknowledgement message from its nearest neighbor TDM 207 within a preconfigured timeout window, TDM 202 may re-transmit the message to the next-nearest neighbor TDM 208. In such examples, TDM 202 may identify TDM 207 as unresponsive within a log file or a database. As such, the TDM network is not dependent upon a particular TDM staying online or timely responding. Further, if TDM 202 becomes unresponsive, another node such as TDM 207 may detect the failure of TDM 202 and take over the responsibilities of TDM 202. In one example, TDM 207 is configured to be the failover TDM node when TDM 202 fails to transmit a heartbeat message 204.

The heartbeat process is repeated at the remaining train detection modules 208 and 209 until the heartbeat message 204 reaches TDM 203. The train detection module 203, which is configured as the last node in the depicted primary network, returns the received heartbeat message to its rear neighbor TDM 209 and the same process is repeated at each intermediate node until the heartbeat message terminates at TDM 202. As each TDM node appends the heartbeat message 204 with status information, the train detection module 202 extracts useful status information from the received heartbeat message 204. TDM 202 also restarts the heartbeat process after a preconfigured time interval. The same process, used to relay heartbeat messages 204 (or heartbeat packets) between train detection modules, is also used to relay a train detection message when a TDM detects a train. Because of the self-healing capability of the TDM network, the TDM network may be described as fault-tolerant and the TDM network avoids a single point of failure.

Figure 3:
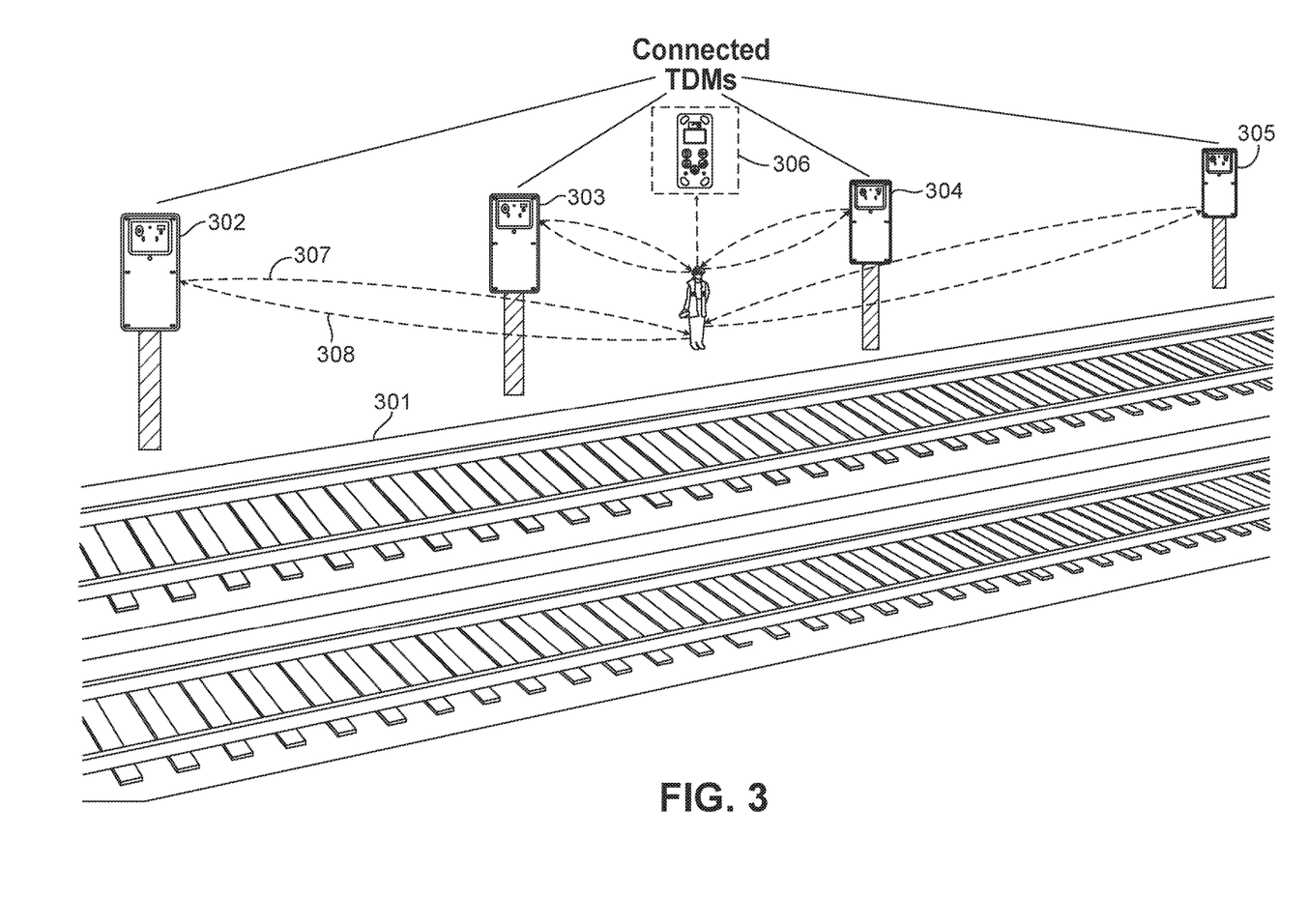
FIG. 3 is a diagram showing redundant wireless communication links between train detection modules of FIG. 1 and a personal alert device of FIG. 1 in a preferred embodiment of the present invention involving a lone roadway worker.

FIG. 3 shows the possible communication links between train detection modules and a personal alert device along a railroad track 301. The system is capable of alerting the personal alert device 306 of the train presence over redundant communication links from the TDM devices 302, 303, 304 and 305. A time division multiplexing technique is implemented to provide collision-free transmission and reception of data between train detection modules 302, 303, 304, 305 and personal alert device 306. All the communication between train detection modules 302, 303, 304, 305 and personal alert device 306 takes place in broadcast mode where each of the train detection modules 302, 303, 304, 305 broadcasts a data packet, called the TDM beacon, in its designated time slot. A TDM beacon 307 contains information including network statistics, an identification number of the TDM, available time slots for the personal alert devices, and information about train location.

The TDM beacon 307 is sent as a broadcast message. A broadcast message is a special type of one-to-many RF transmission where a single source transmits its information to multiple receivers at the same time. Thus, personal alert devices such as personal alert device 306 receive TDM beacon 307. In response, personal alert device 306 broadcasts a response packet 308, called the Worker Wearable (WW) broadcast 308. In the example embodiment, broadcast 308 contains information including the worker identifier, the personal alert device identifier, location information, and other status information. The use of broadcasts in precisely timed intervals provides fast, collision-free and reliable RF communication with multiple or redundant logical communication links between personal alert devices and train detection modules.

Figure 4:
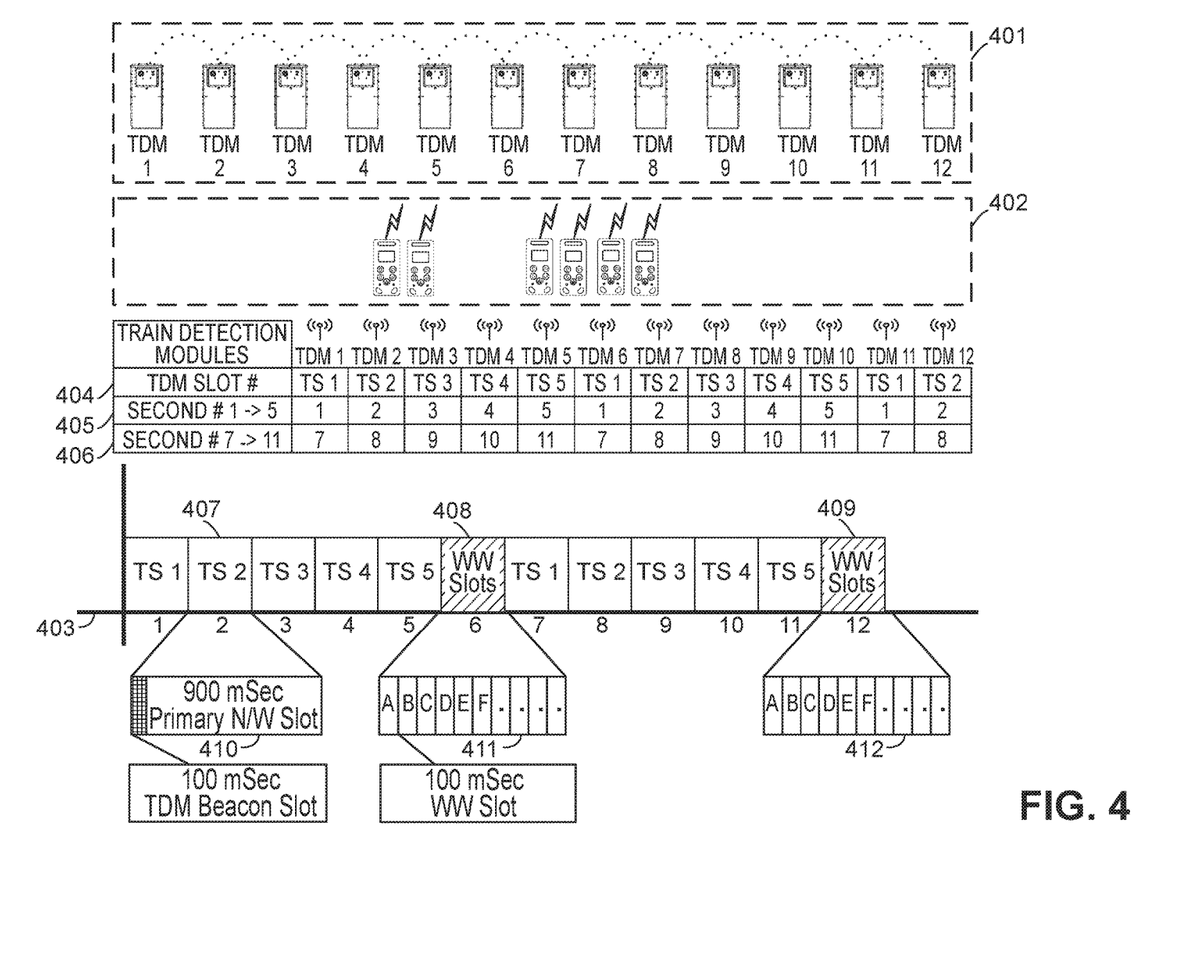
FIG. 4 explains the model of time dimension multiplexing (TDMA) used in the present invention.

FIG. 4 depicts the approach to time division multiplexing used in the preferred embodiment. A primary TDM network of twelve train detection modules is shown by block 401 and a group of six personal alert devices shown in block 402. In the example embodiment, each of the train detection modules of block 401 is assigned a unique time slot, called the TDM slot, from a pool of five time slots as shown in row 404. As shown in FIG. 4, the time slots are re-assigned after five nodes as the physical separation of five train detection modules is sufficient to avoid any packet collisions at the RF level. The rows 405 and 406 further explain the concept of time slot re-assignment with mapping of time slots for the first twelve (12) seconds. Graph 403 depicts a mapping of time slots on a horizontal time scale. The span of TDM slots can be configured according to system requirements, however in the preferred embodiment, the TDM slot of one second duration is used. Each TDM slot is further divided into a TDM Beacon slot spanning 100 milliseconds and a Primary Network ("N/W") slot of 900 milliseconds as shown by the exploded view 410 of the TDM slot 407. All the communication broadcasts from train detection modules to personal alert devices take place in the TDM Beacon slots whereas all the peer-to-peer communications, occurring in the primary TDM network in the form of unicast message transmissions, make use of the Primary N/W slots.

As is shown in the time graph 403, the sixth and twelfth second slots are not available to be assigned as TDM slots, instead these intervals are reserved for the broadcasts originated from personal alert devices. An exploded view of the sixth and twelfth seconds is shown by 411 and 412 respectively where each of the seconds 408 and 409 is divided into 10 equal time slots, called WW slots ("Worker Wearable"), spanning 100 milliseconds each. The WW slots are used by the personal alert devices to broadcast response messages to the TDM primary network. The response message includes the unique ID and location of the personal alert device along with other commands and related information. The system takes care of the usage of WW slots and every personal alert device is assigned a unique slot dynamically by its central train detection modules. Furthermore, WW slots also get re-assigned to some other personal alert device when the personal alert devices are moved from one TDM to other.

There can be three types of personal alert devices depending upon the role of the workers. The devices are the Roadway Worker In Charge (RWIC) device, the Worker Wearable (WW) device and the Worker Lookout Wearable (WLW) device. A lone worker can just carry the RWIC device and join the primary TDM wireless network by selecting the track where he intends to work. In case of a group of workers, the Roadway Worker In Charge is responsible for an on-site briefing before starting up the work and synchronizing his workers with the RWIC device.

Figure 5:
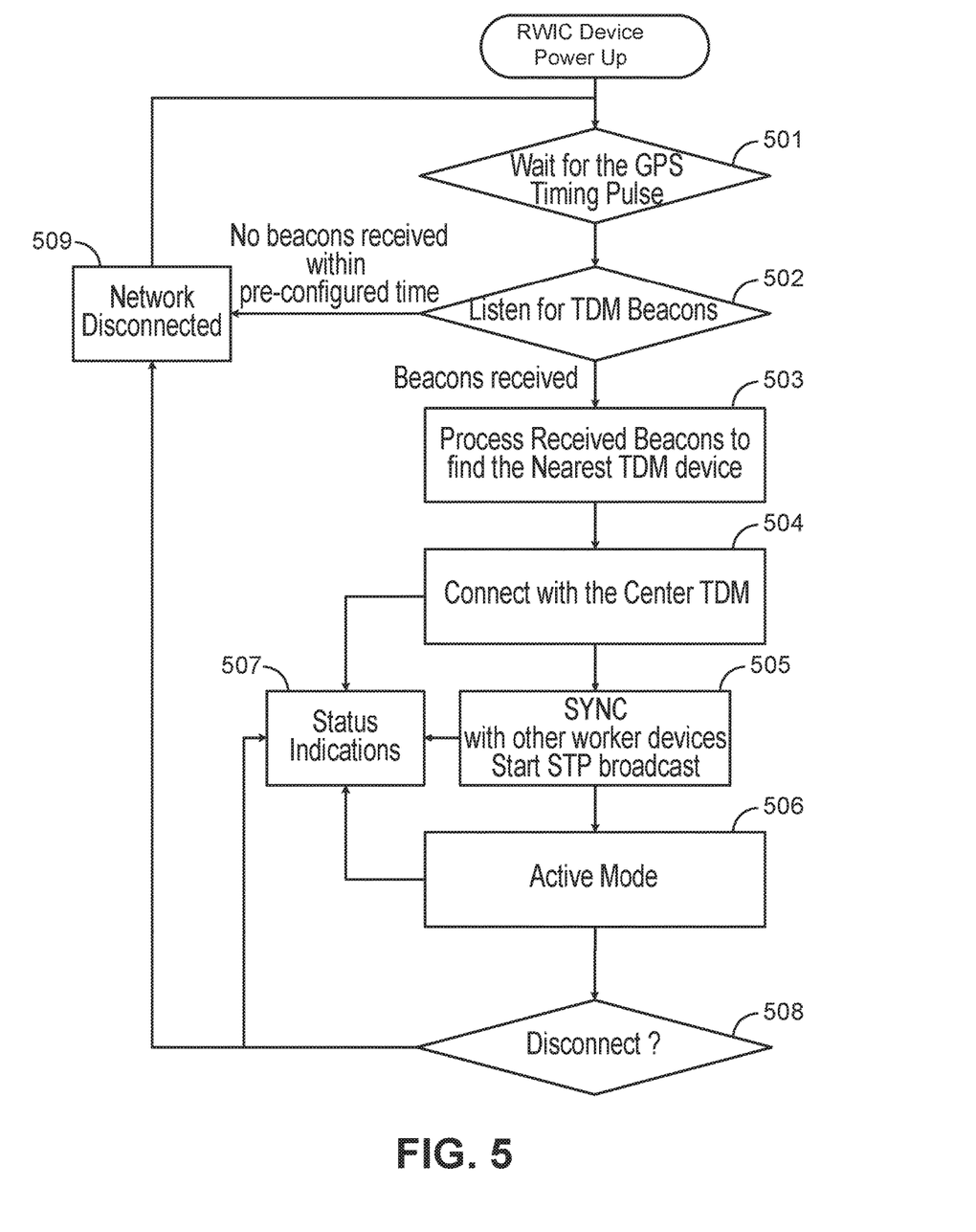
FIG. 5 is flow diagram performed by personal alert devices.

FIG. 5 depicts an exemplary process performed by a personal alert device. As shown in FIG. 5 by block 501 the Roadway Worker In Charge device ("RWIC device") waits for the availability of GPS timing pulse. The timing pulse is used to synchronize the internal clock of the RWIC device with that of the TDM devices in the primary network. The RWIC device also connects with the primary TDM wireless network by listening to TDM beacons broadcast by TDM devices as indicated by block 502. If no TDM beacons are detected within a pre-configured time window, the RWIC device will disconnect from the network as indicated by block 509.

As shown in block 503, RWIC device selects the nearest TDM device, also termed as center TDM, from the received TDM beacons based upon a combination of location information and information regarding radio signal strength, such as RSSI.

The received TDM beacons also include information regarding the time slot used by each TDM and indicating the available WW time slots for the Worker Wearable devices to use in response.

The RWIC device also transmits a connect packet, as shown by block 504, to the center TDM using one of the available WW time slots and the center TDM sends an acknowledgement response in the next TDM beacon.

As shown in block 505 in FIG. 5 the RWIC device initiates a synchronization process with other worker devices by broadcasting a Synchronization Time Period (STP) request to the WLW and WW worker devices. The STP is a configurable time window during which each of the worker devices exchanges its ID information with the RWIC device. During the synchronization process, the RWIC devices also share a unique group identifier used by all the workers for future communications with the primary TDM network.

After successful synchronization with the RWIC device, the worker devices then connect with the primary TDM network by using available time slots and following the same process as used by the RWIC device to connect with the TDM network in the beginning. The RWIC device then enters Active Mode as shown by the block 506 during which all WLW and WW worker devices exchange packets with the RWIC device over the TDM primary network. The RWIC device can also issue commands to the worker devices over the same TDM primary network. The WLW devices add an additional layer of safety to the system. Worker lookouts or flaggers located at both ends of a protected work zone can carry the WLW devices and manually set an alarm on the communication network when they observe a train approaching the work zone. As depicted by the block 507, the RWIC device also displays its status on an LCD screen and status LEDs. After performing their duties, the roadway workers can disconnect the device from the primary network as shown by 508 in FIG. 5.

Figure 6:
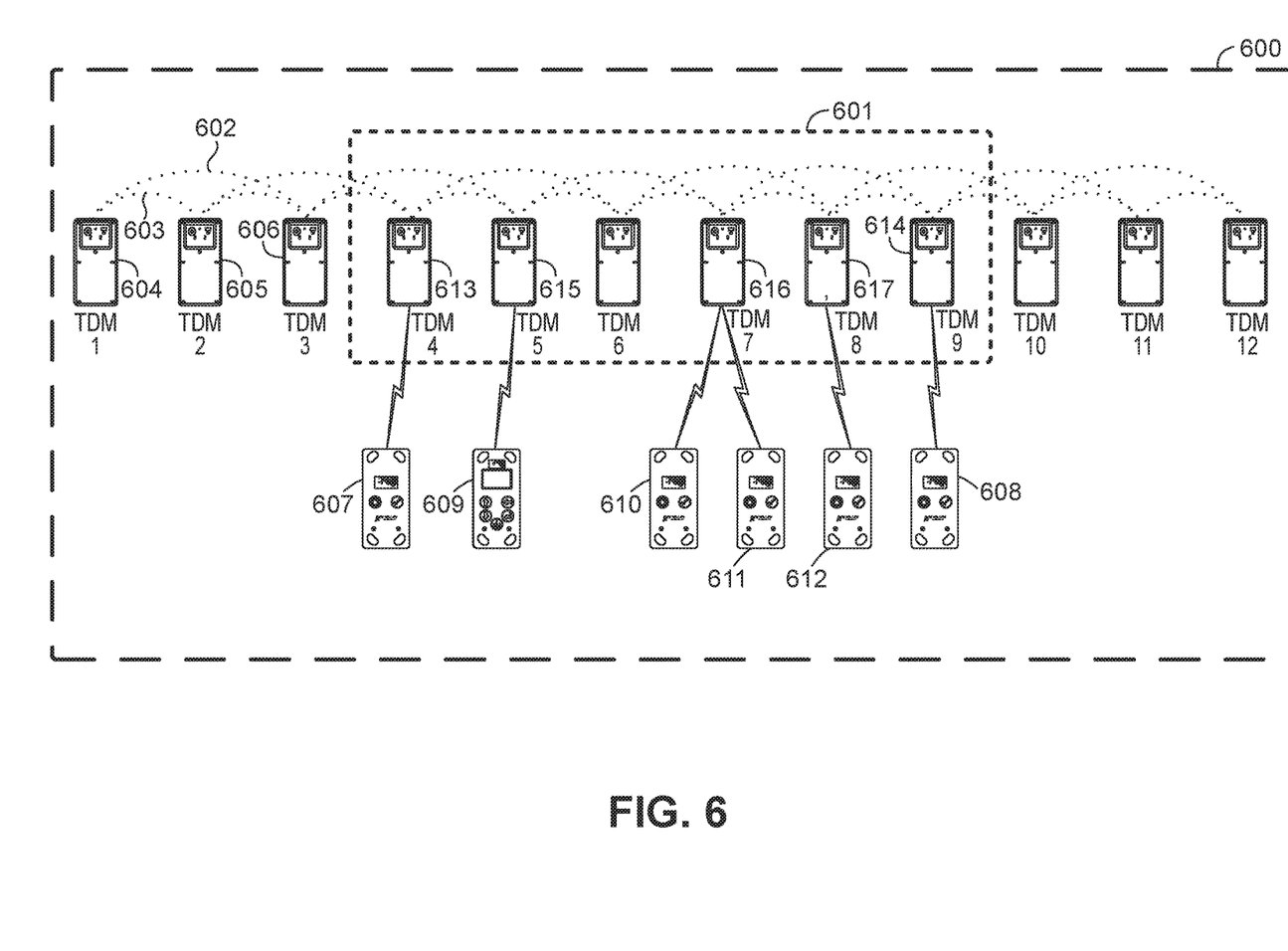
FIG. 6 is a diagram showing wireless communication links between train detection modules and personal alert devices in another preferred embodiment of the present invention involving a group of roadway workers.

In a preferred embodiment, a group of roadway workers is shown in FIG. 6 forming an ad hoc wireless communication network and interacting with the primary TDM wireless network. This embodiment uses a combination of train detection modules and personal alert devices including an RWIC device, two WLW devices, and three WW devices. Two Flaggers, carrying WLW devices, are positioned to define the area where the rest of the roadway workers perform their duties. After following the synchronization process explained above the group is in active mode and exchanges commands over the TDM primary network. The RWIC device 609 is connected with the TDM 615. The two WLW devices 607 and 608 are connected with the TDM 613 and 614, respectively. The TDM 616 is central to two of the WW devices 610 and 611 as shown in the figure while one worker device, WW 612, is connected with the TDM 617. A protected work zone 601 is formed which is defined by position of the two WLW devices. In the preferred embodiment the system has the capability to automatically track the WLW devices and re-define the boundaries of the active work zone by using the location of the TDM devices to which the two WLW devices are connected at any given time and any change in the boundaries of work zone is also updated over the entire network of TDM devices.

The TDM primary network consists of twelve TDM devices where the network is formed by peer-to-peer communications between the TDM devices. The TDM primary network comprises redundant communication links as shown by the lines 602 and 603 between the TDM 604, 605, and 606. Whenever a TDM detects train, it generates a unicast alert message to its neighbors that is propagated on the network using peer-to-peer communications. Thus, all the TDM devices have real time information regarding where the train was detected and this information is used by the central TDM devices 613, 614, 615, 616 and 617 to calculate the train Estimated Time of Arrival (ETA) and generate train alerts if the calculated ETA is less than a pre-configured threshold. As an additional layer of safety, the worker lookouts or flaggers can also manually set a train warning alarm on the communication network through their WLW devices 607 and 608 when they observe a train entering the protected work zone 601.

Figure 7:
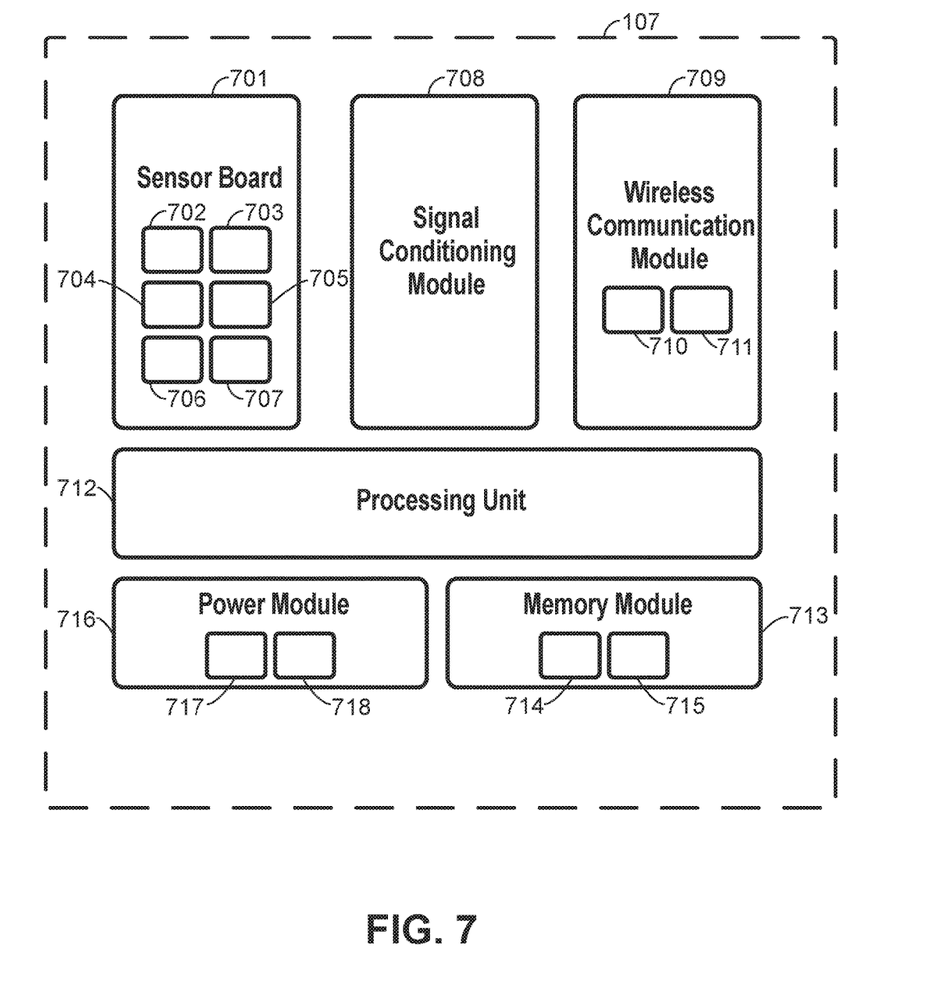
FIG. 7 is a block diagram of components of a train detection module of FIG. 1.

FIG. 7 shows components of the train detection module 107. The train detection module 107 includes a sensor board 701 having an array of sensors configured for train detection. The sensor board 701 includes a laser rangefinder 702 which continuously fires a laser beam and senses the presence of train by receiving a portion of the beam reflected by the train. Another sensor used for train detection is the image sensor 703, which compares multiple motion JPEG frames to detect a moving train. In the preferred embodiment, infrared light is used in case of low ambient light conditions and during harsh weather as detected by the light sensor 704. Another sensor used for train detection is the frequency modulated continuous wave (FMCW) radar 705. The radar 705 is configured to continuously emit frequency modulated radio waves of high frequency towards the railroad track, some of which are reflected back by an approaching train and the receiving end of the radar processes the reflected wave to detect the train. Yet another sensor used for train detection is the active IR sensor 706 comprising an infrared transmitter and receiver. The IR transmitter emits a beam of infrared pulses towards the railway track whereas the receiving end receives and processes the portion reflected by the train. An inertial measurement unit (IMU) 707 is used to detect changes in orientation of the train detection module 107 due to impact by other objects or environmental conditions such as strong winds or heavy snow. As the signals received from most the aforementioned sensors are in analog form and may also contain some unwanted noise, an analog signal conditioning unit 708 is used to remove unwanted noise from the signals and process the analog signals to be used for processing in later stages.

The train detection module 107 also includes a wireless communication module 709 which comprises a low power radio transceiver 710 and a cellular modem 711. In the exemplary embodiment, the RF transceiver 710 includes, for example, an XBee-PRO 900 HP module which is configured to create peer to peer wireless mesh communication network with other train detection modules and personal alert devices. The RF transceiver may use suitable wireless networking protocols to establish and maintain the wireless mesh network including, but not limited to, DigiMesh protocols. The processing unit 712 is responsible for executing the train detection module software which includes functions such as performing startup verifications, processing signals received from sensors for making decisions, execution of a battery voltage monitoring algorithm and preparation of data packets to be transmitted to the connected devices over the wireless network. The configuration parameters for various components of the train detection module 107 are stored on non-volatile memory 714 available in the memory module 713. A real time clock RTC 715 is also available in the memory module 713 for all time keeping purposes.

A power module 716 includes components to provide power to various components of train detection module 107. The power module 716 includes a battery 717 which provides battery backup to the train detection module 109. In the example embodiment, battery 717 is a rechargeable lithium ion battery. In alternative embodiments, battery 717 may be any suitable battery including a rechargeable lead acid battery. The power supply unit 718 provides suitable power to various components and sub-systems of a train detection module. Battery voltage monitoring is also a responsibility of the power module 716 where the power supply unit 718 monitors the state of charge of the rechargeable battery and generates alerts in case the battery gets low.

Figure 8:
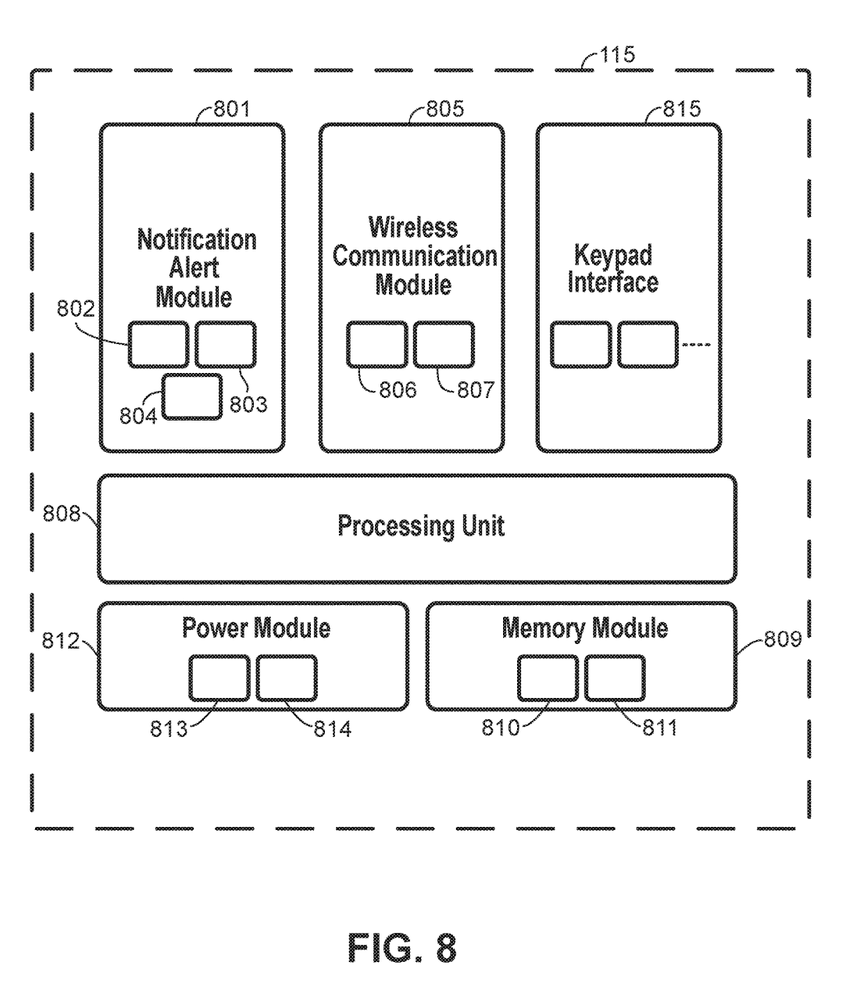
FIG. 8 is a block diagram showing various components of a personal alert device of FIG. 1.

FIG. 8 shows various components of the personal alert device 115. The notification alert module 801 is used to notify the roadway worker of a detected train 102. Audio warning means 802 includes a buzzer; visual warning means 803 includes LED lights and LCD whereas haptic warning means 804 includes a mechanical vibrator. A wireless communication module 805 is available in the personal alert device 115 which provides means for wireless communication with other personal alert devices and train detection modules. An RF transceiver 806 such as XBee-PRO 900 HP similar to that present in the train detection module 107, facilitates transmission and reception of messages over the wireless link used by communication module 805. The Bluetooth module 807 is used to transmit voice alert messages to the bone conduction headphone 1004 over Bluetooth.

The processing unit 808 is a microprocessor which executes the firmware of the personal alert device. Tasks performed by the processing unit 808 include: performing startup verifications, preparing data packets for transmission, receiving and transmitting data from and to the train detection module 107 and transmitting voice alerts over Bluetooth communication link to the bone conduction headphones 1004, generating alerts based on the type of warning message received and executing battery voltage monitoring algorithm. The memory module 809 includes a non-volatile memory 810 for storing configuration parameters and an RTC 811 for time stamping purpose. The power module 812 includes a Li-ion rechargeable battery 813 which provides power backup to the personal alert device 115. The tasks of power supply unit 814 include supplying appropriate power to each component of the personal alert device 115 and performing battery voltage monitoring in order to monitor the state of charge of the rechargeable battery so that alerts can be generated in case of a low battery condition. The personal alert device 115 also includes a keypad interface 815 which can be used to enter authentication information and other configuration data when required.

Figure 9:
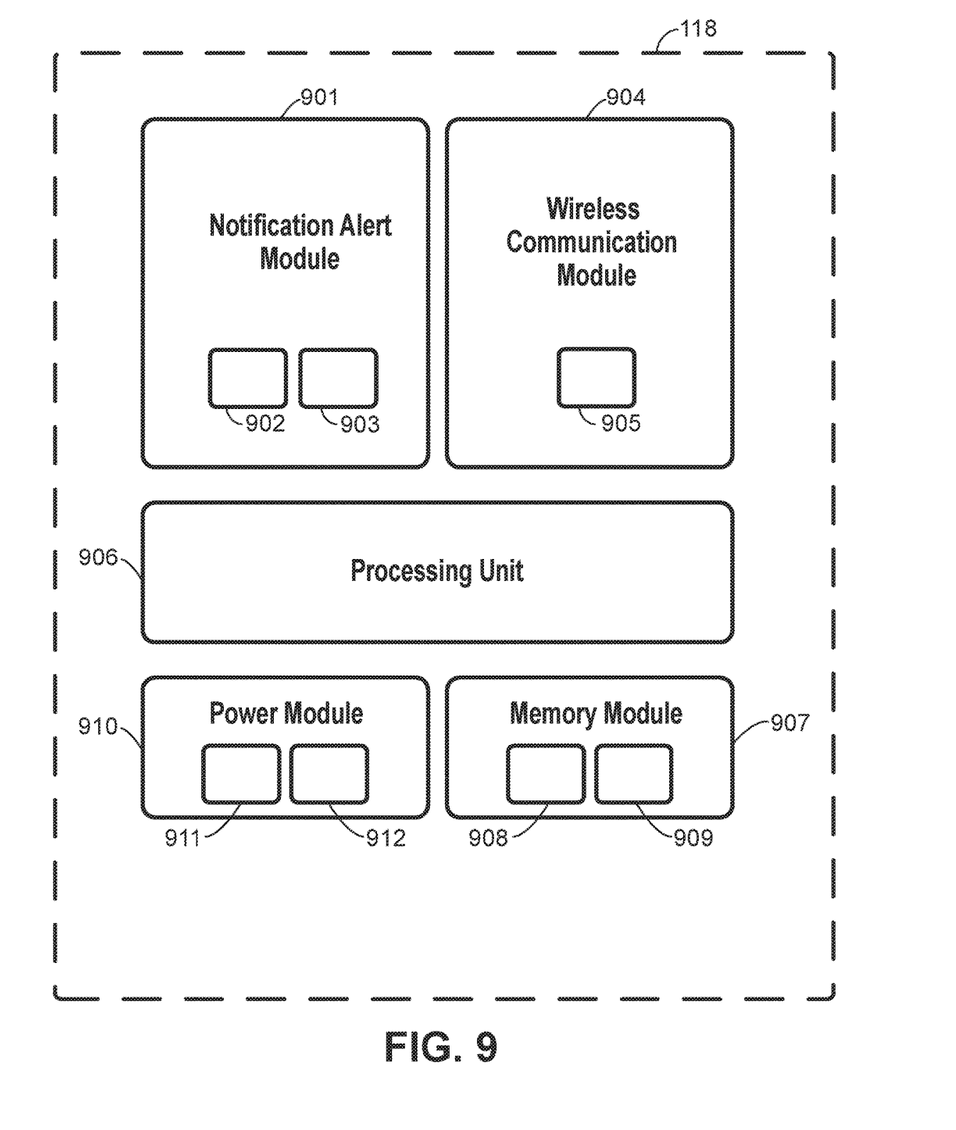
FIG. 9 is a block diagram showing various components of an operator alert device of FIG. 1.

FIG. 9 illustrates components of the operator alert device 118. The notification alert module 901 includes at least one of an audible alert device 902 which is a buzzer and a visual alert device 903 which is an LCD display. Wireless communication module 904 includes an RF transceiver 905, similar to that in the train detection module 107 and the personal alert device 115, such as the XBee-PRO 900 HP.

The RF transceiver 905 is configured to substantially remain in receiving mode as it is not a part of the wireless mesh communication network 600. The train detection module 107 is configured to transmit the beacon multiple times per second which includes work zone coordinates that are known to all train detection modules. This beacon is received by the RF transceiver 905 and the operator alert device 118 warns the train operator of an oncoming work zone 103 through the buzzer and/or by displaying the received data, which include the work zone location, on the LCD. Alternatively, the train detection module 107 can selectively transmit the beacon at time intervals such as, for example only, every three seconds. The time intervals can be predetermined or transmitted randomly.

The processing unit 906 includes a microprocessor which is used for: execution of the operator alert device firmware, receiving and decoding data packets from the train detection modules, generating audible warnings, displaying work zone data on the LCD and executing the battery voltage monitoring algorithm. The memory module 907 includes a non-volatile memory 908 which is configured to store configuration parameters. It also includes a real time clock 909 for time stamping of events. The power module 910 includes a lithium ion battery 911 capable of providing power backup to the operator alert device 118. The power supply unit 912 also performs battery voltage monitoring functions to generate alerts in case of low battery voltage.

Figure 10:
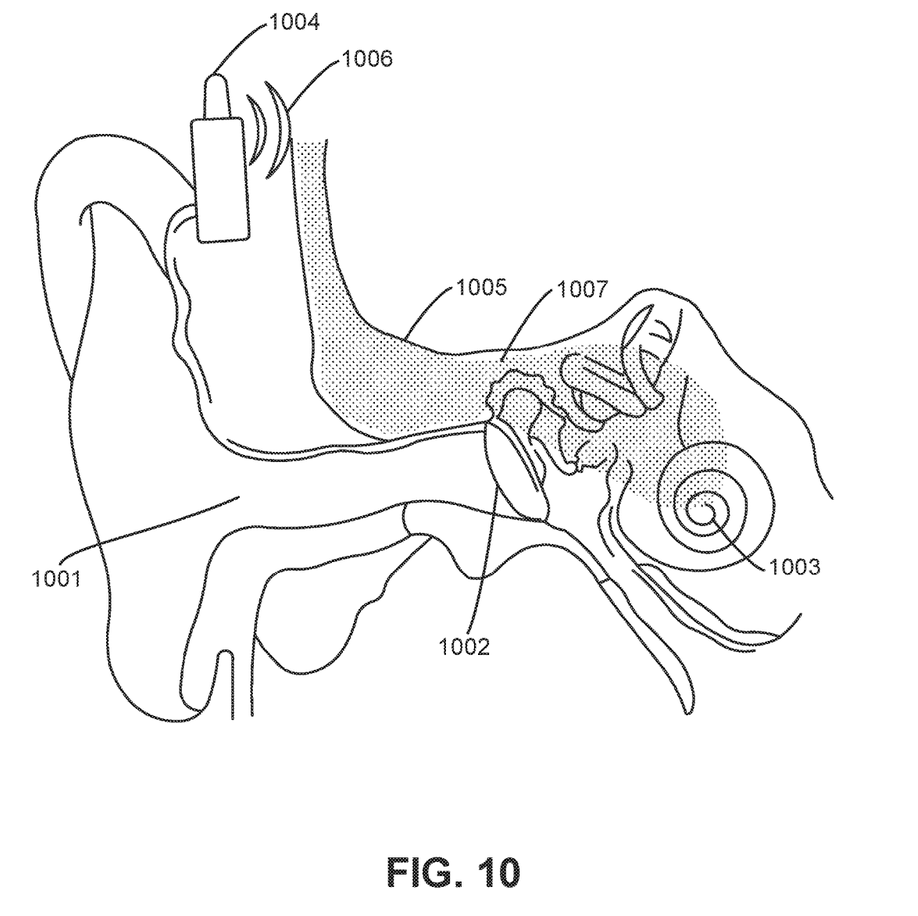
FIG. 10 describes the mechanism of bone conduction used for transmitting audio alerts to the roadway worker in a preferred embodiment of present invention.

FIG. 10 illustrates the concept of bone conduction audio transmission for communicating voice alerts to the railroad worker 104. The normal hearing function is achieved by the external auditory canal 1001 and the eardrum 1002. The sound waves enter the ear through the auditory canal 1001; and, the eardrum 1002 then converts vibrations into signals that are received by the hearing cells in cochlea 1003. The cochlea 1003 then sends these signals to the brain through the auditory nerve, which are interpreted as sound. The bone conduction method uses a bone conduction transducer 1004 employed in, for example, bone conduction headphones to convert sound waves into mechanical vibrations shown as 1006 which are transmitted to the cochlea 1003 through the temporal bone 1007 instead of the normal hearing path using auditory canal 1001 and ear drum 1002. The transducer 1004 is designed to transmit sound vibrations 1006 travelling directly to the cochlea 1003 through the temporal bone which are then transmitted to brain for interpretation. The method of using bone conduction provides better situational awareness to the roadway worker 104 as the ear is not covered and the normal hearing path is not interrupted while at the same time voice alerts are conveyed reliably to the worker. The enhanced situational awareness thus facilitates roadway worker safety.

The invention claimed is:

1. A fault-tolerant system for detecting an approaching train on a railroad track and warning at least one roadway worker present near a portion of said railroad track or an adjacent track of the approaching train, the system using a self-healing wireless network architecture, the system comprising:

a plurality of train detectors placed along the length of said railroad track, wherein said train detectors are configured to communicate wirelessly with each other to form a peer-peer wireless mesh network, wherein said train detectors are configured to transmit heartbeat communications within said wireless mesh network and cause said mesh network to be fault-tolerant;

at least one personal alert transceiver configured to receive train alerts generated by said train detectors, and further configured to transmit at least one worker response to said wireless mesh network via at least one said train detector;

a railroad vehicle or a train equipped with an operator alert transceiver configured to communicate wirelessly with at least one of said train detectors and said wireless mesh network, at periodic intervals; and a remote server for configuring said train detectors remotely.

2. The system of claim 1, wherein said train detectors are configured to transmit messages using time-division multiple access networked communications, wherein said wireless mesh network is configured to assign a time slot to each said train detector, wherein said time slots comprise a TDM beacon slot and a primary networking slot, wherein each train detector is configured to create and transmit messages.

3. The system of claim 2, wherein said messages comprise network statistics, an identification number of the transmitting train detector, a set of predetermined available time slots for said personal alert transceivers, and a set of information about a location of said train.

4. The system of claim 1, wherein said personal alert transceivers are configured to transmit messages using time-division multiple access networked communications, wherein said wireless mesh network is configured to assign a worker wearable time slot to each said personal alert transceiver, wherein each personal alert transceivers is configured to create and transmit messages, wherein the messages are transmitted in said worker wearable time slots.

5. The system of claim 4, wherein said messages comprise a unique identifier for the transmitting personal alert transceiver, a set of fields containing worker responses and a determined location of the personal alert transceiver.

6. The system of claim 1, wherein said train detectors are configured to detect trains on said railroad track and propagating train alert messages along said peer-peer wireless mesh network.

7. The system of claim 1 further comprising a structure coupled to said train detectors for selectively positioning said train detectors along the railroad track.

8. The system of claim 7 wherein said structure comprises a milepost which is configured to integrally couple to said train detector.

9. The system of claim 1, wherein said train detector comprises:
(a) a sensor unit consisting of a plurality of simultaneously active diverse sensors configured to detect an oncoming train or a railroad vehicle;
(b) a wireless communication module;
(c) a processor configured to execute logic for establishing a peer-peer wireless mesh network of said train detectors and generating train alerts upon detecting a train or other on-track vehicle;
(d) a power management charger responsible for charging backup batteries and generating voltages required for functioning of various components of said train detector; and
(e) a re-chargeable battery.

10. The system of claim 9, wherein said sensor unit comprises a combination of at least two diverse sensors, said diverse sensors are simultaneously active, said diverse sensors include at least one of:
(a) a frequency modulated continuous wave (FMCW) radar working in Industrial, Scientific, and Medical (ISM) telecommunication band;
(b) a laser based range finder;
(c) a 3-axis MEMS accelerometer; and
(d) an image sensor.

11. The system of claim 9, wherein said wireless communication module comprises a radio transceiver operating in ISM band to exchange wireless messages with other train detectors and personal alert transceivers.

12. The system of claim 9, wherein said wireless communication module further comprises a cellular modem configured to connect with said remote server using the cellular data network.

13. The system of claim 9, wherein said processor further executes a logic to generate train presence alerts based on the input of said diverse sensors of said sensor unit.

14. The system of claim 9, wherein said processor further executes a logic to calculate Estimated Time of Arrival (ETA) of the train detected by said train detectors and generating train warning messages over Bluetooth if the calculated ETA is below a pre-configured threshold.

15. The system of claim 1, wherein said personal alert transceiver further comprises:
(a) a wireless communication module;
(b) a processor;
(c) a haptic feedback device;
(d) a human machine interface; and
(e) a chargeable battery.

16. The system of claim 15, wherein said wireless communication module comprises a radio transceiver operating in ISM band to exchange wireless messages with train detectors and personal alert transceivers.

17. The system of claim 15, wherein said wireless communication module further comprises a Bluetooth module configured to connect with a bone-conduction wireless headphone and transmit voice alert messages over the Bluetooth protocol.

18. The system of claim 15, wherein said processor executes a logic to make an ad hoc wireless mesh network with said train detectors.

19. The system of claim 15, wherein said haptic feedback device is a mechanical vibrator.

20. The system of claim 15, wherein said human machine interface comprises light emitting diodes to provide train warning alerts and device status to roadway workers.

21. The system of claim 15, wherein said human machine interface further comprises an LCD display to provide visual train warnings and device status information to the roadway workers.

22. The system of claim 15, wherein said human machine interface further comprises a buzzer to provide audible alerts to roadway workers.

23. The system of claim 15, wherein said human machine interface further comprises a keypad interface for the roadway worker to interact with the personal alert transceiver.

24. The system of claim 1, wherein said operator alert transceiver further comprises:
(a) a radio transceiver operating in ISM band to exchange wireless messages with train detectors;
(b) a processor executing a logic to receive messages from train detectors and calculate roadway worker position; and
(c) a human machine interface for the train operator.

25. The system of claim 24, wherein said human machine interface comprises an LCD display to visually display the position of roadway workers along the track.

26. The system of claim 24, wherein said human machine interface also includes a buzzer to provide audible alerts to the train operator.

27. The system of claim 1, wherein said remote server configures the train detectors using the cellular network.

28. A method of warning a roadway worker or a group of roadway workers about an approaching train performed by a fault-tolerant wireless mesh network comprising a plurality of train detection modules and a plurality of personal alert devices, the method comprising:
- detecting a train on said railroad track or an adjacent track using at least one of a plurality of diverse sensors in communication with at least one train detection module;
- propagating train alert messages over a wireless network of train detection modules, wherein said train detection modules are configured to communicate wirelessly with each other to form a peer-peer wireless mesh network, and wherein said train detection modules are configured to transmit heartbeat communications within said wireless mesh network and cause said mesh network to be fault-tolerant;
- synchronizing one or more personal alert devices with said wireless network of train detection modules;
- receiving, from at least one of the one or more personal alert devices, at least one worker response;
- propagating worker responses over said wireless network of train detection modules;
- determining a work zone associated with the plurality of worker devices;
- providing information regarding a determined location of the work zone to an operator communication device;
- calculating an estimated time of arrival of a first train detected by at least one of said train detection modules;
- generating warnings if the estimated time of arrival falls below a pre-configured threshold; and
- transmitting the generated warnings to said one or more personal alert devices.

29. The method of claim 28, wherein detecting the train comprises processing the outputs of a plurality of diverse sensors configured to detect a train on said railroad track or an adjacent track.

30. The method of claim 28, wherein said wireless network is a peer-peer mesh network.

31. The method of claim 28, wherein said synchronizing the one or more personal alert devices comprises listening to the wireless beacons transmitted by said train detection modules at designated time intervals.

32. The method of claim 28, wherein said warnings comprise a haptic feedback.

33. The method of claim 28, wherein said warnings further comprise generating audio and voice alerts.

34. The method of claim 28, wherein said warnings further comprise flashing light emitting diodes in pre-configured patterns.

* * * * *